Sept. 13, 1966     L. E. GERNANDT ETAL     3,271,813
DEVICE FOR MOLDING MEAT PRODUCTS
Filed Nov. 27, 1964     3 Sheets-Sheet 1

INVENTORS:
LOUIS GERNANDT
WILLIAM J. OESTREICH
BY
Carl C. Batz
ATT'Y

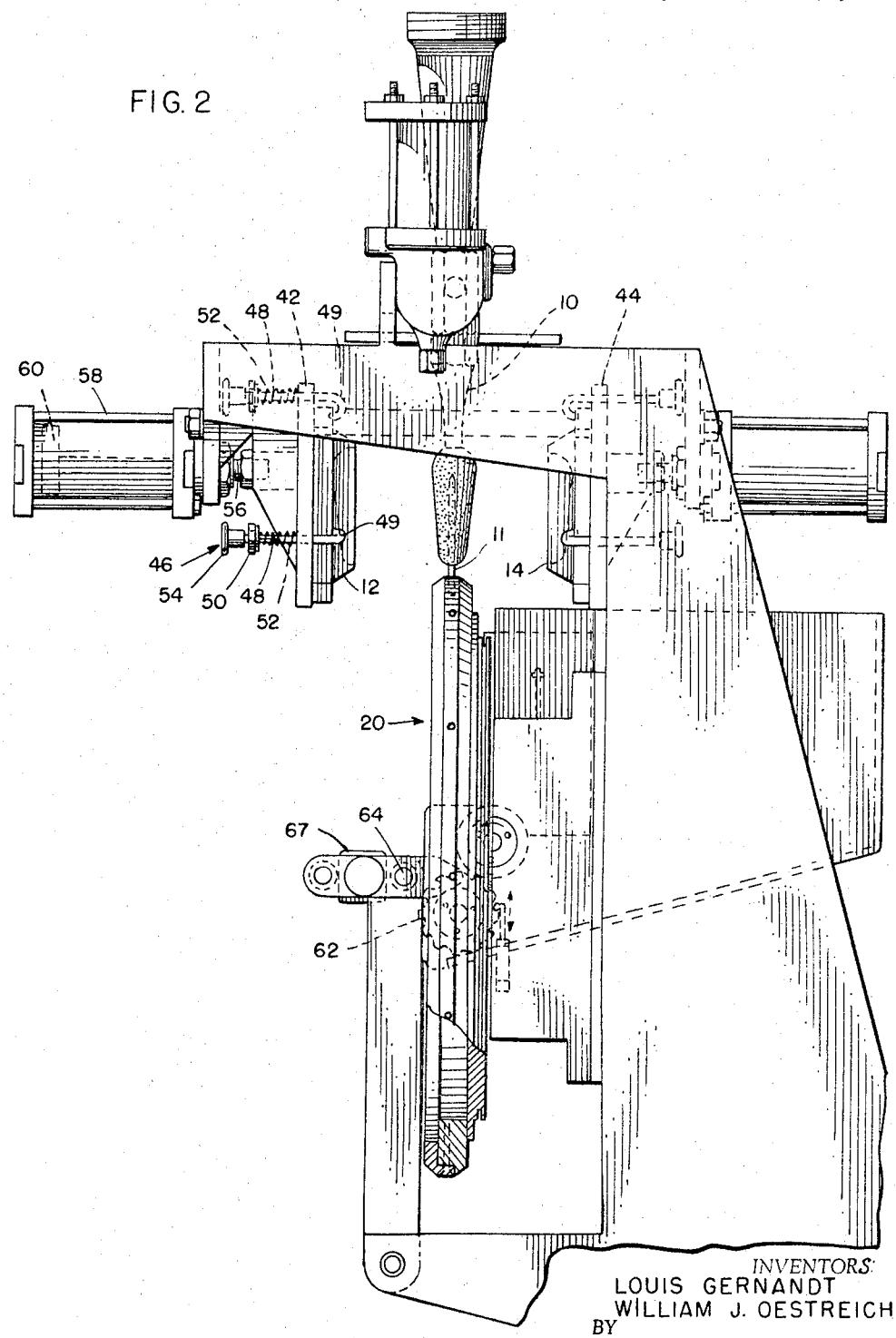

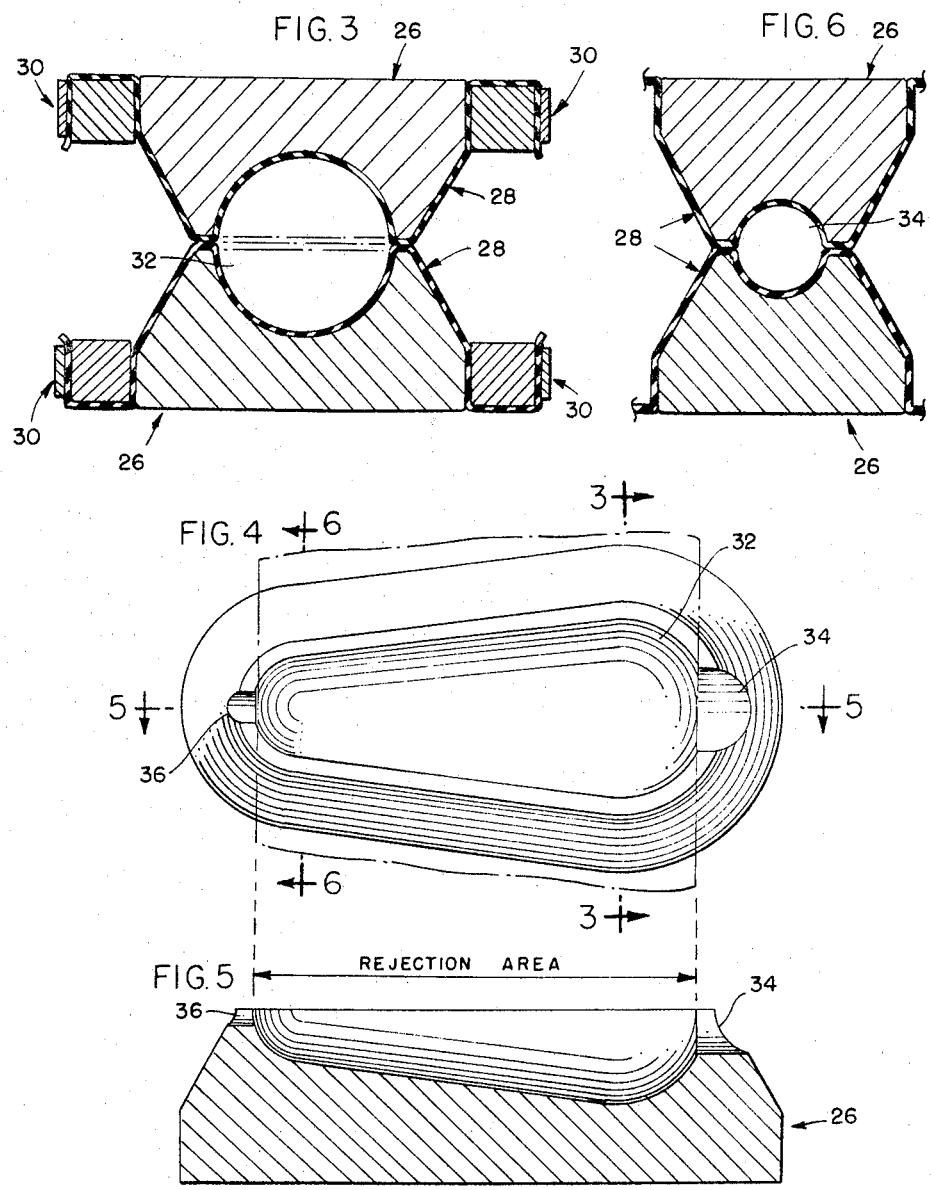

3,271,813
DEVICE FOR MOLDING MEAT PRODUCTS
Louis E. Gernandt and William J. Oestreich, Eau Claire, Wis., assignors to Armour and Company, Chicago, Ill., a corporation of Delaware
Filed Nov. 27, 1964, Ser. No. 414,364
4 Claims. (Cl. 17—1)

This invention relates to apparatus for forming relatively soft, plastic materials about a wooden stick for easy handling. More specifically, this invention relates to a machine of the type used for forming ground meats into specific shapes around a wooden stick, as is exemplified in tthe product commonly called "mock chicken legs."

Although this invention has broader application and may be used for many diverse molding and forming operations, yet the present embodiments have been adapted particularly for use in connection with ground meats and are specifically conceived and designed to solve the rather unique problems arising in relation to the formation of such soft meat products.

While it has long been recognized that the formation of mock chicken legs by machine was highly desirable as representing a means of achieving a substantially uniform product easily susceptible to advanced quality control techniques, which machines reduced significantly the labor cost involved in producing such a product, as well as the variations from standards which result from such labor, yet ground meat products have not lent themselves well to facile, economical shaping into desired forms.

Particularly in a fast molding operation such as must be used to permit a forming machine to compete with hand labor, the molding process must be rapid, efficient, and sufficiently reliable to prevent the formation of misshapen mock chicken legs which would have to be rejected.

The primary problem, then, is to provide a mold which is sufficiently rapid in operation to accommodate production scheduling of 36 to 50 mock chicken legs per minute, which will provide a true chicken leg shape without sharp corners; and which is immediately reusable without intervening cleaning operations.

Thus, as this apparatus is conceived of, the molding apparatus is the critical element to successful operation. Of course, metallic molds are quite advantageous in use since they represent a relatively undeformable surface, are not easily cracked or broken, and represent a sufficient weight to insure smoothness of operation. However, ground meat tends to adhere to metallic molds, especially at the temperatures under which such molds will be used. When the ground meat adheres to the metallic molds during a forming operation, the results are quite unsatisfactory inasmuch as the initial molded chicken leg is not of the conformation desired, and subsequent mock chicken legs are formed accordingly by the presence of adhering residual meat in the mold. One solution to this problem has been the use of heated metallic molds which of course necessitates a rather unwieldy amount of equipment, imposing space limitations on the device as well as increasing the cost of operation, maintenance and repair.

A further disadvantage to the use of metallic molds has been the lack of a complete seal about the stick-receiving portion of the mold halves and about the nozzle-receiving portion of the mold halves. Since the ground meat must be injected into the mold under a certain amount of pressure in order to assure that the ground meat will assume the proper conformation delineated by the mold halves, the sealing becomes even more critical to effective operation. Further, it has been found that by maintaining a firm pressure on the mold product for a short period after formation and prior to release, the cohesiveness of the molded leg is enhanced. This could not be obtained effectively with the use of a simple metal mold not only because of inherent limitations in such molds but also because of the lack of appropriate and complete sealing.

Of course holding the ground meat under pressure for a slight period of time necessitates the presentation of a relatively firm stick to the mold for the molding action. Obviously, any movement of the stick within the mold would tend to destroy the seal, and would prevent the firm molding of the ground meat about the stick and cause a loose fitting, which would be highly undesirable for use when served.

Also, after the ground meat has been molded about the stick handle, it is highly desirable to expedite the wrapping or packing of the molded mock chicken leg in order to prevent deformation due to the stress placed upon the molded portion when unsupported.

Therefore, it is a primary object of this invention to provide an apparatus for forming soft plastic materials, such as ground meat, about a wooden stick for easy handling; which apparatus embodies the use of molding means which permit relatively fast forming action; which obviates any tendency of the soft plastic material to adhere to the mold and thus produces a substantially uniform product while minimizing or completely eliminating rejects because of mis-shapeness; which will accommodate production scheduling of from 36 to 50 molded units per minute while providing the advantages of simple metallic molds in presenting a relatively undeformable mold surface not easily cracked or broken while embodying sufficient weight to insure smoothness of operation; which eliminates the need for special mold heating equipment and apparatus, thus decreasing the cost of operation, maintenance and repair; which provides for a complete and effective sealing of the mold about the thick handle and the ground meat-dispensing nozzle; which maintains substantially constant pressure on the molded meat product about the stick handle until the mold halves are parted; which apparatus provides for an effective presentation of a firm stick handle to the mold halves for the molding operation and significantly reduces the time the molded meat stick is unsupported after formation.

Other objects and advantages of the present invention will become evident from the more particular description and the drawings, in which:

FIG. 2 is a side elevational view of the more detailed preferred embodiment of the apparatus;

FIG. 3 is a cross-sectional view of the mold halves of the preferred embodiment of this invention, as taken along line 3—3 of FIG. 4;

FIG. 4 is a top plan view of one of the mold halves as shown in FIG. 3, without the flexible diaphragm;

FIG. 5 is a vertical cross-sectional view of the mold half shown in FIG. 4, taken along line 5—5; and FIG. 6 is a cross-sectional view of the mold halves as that would appear along line 6—6 of FIG. 4.

Figure 1:
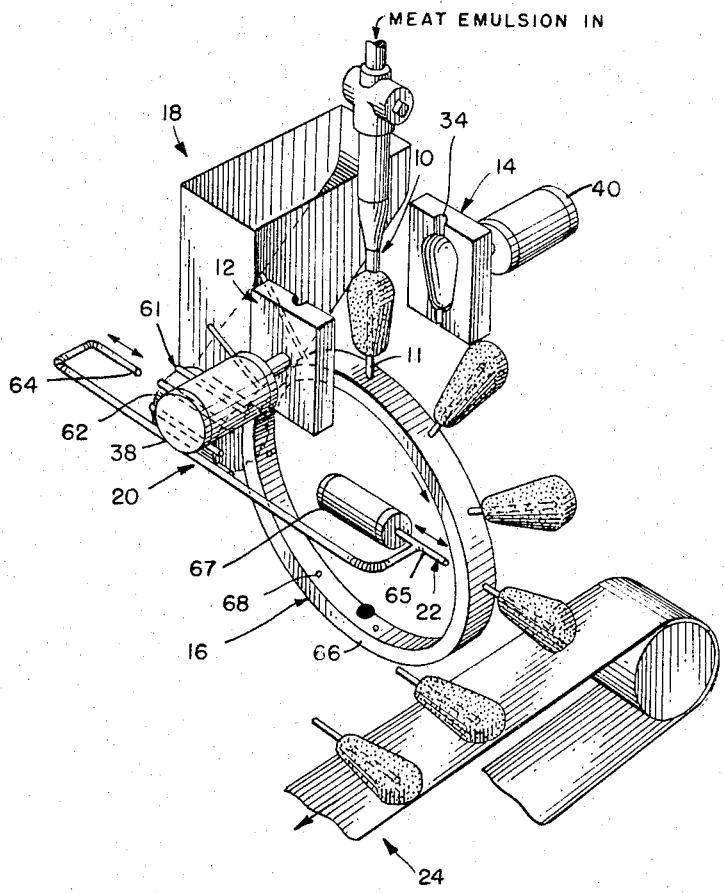
FIG. 1 is a schematic drawing in perspective showing a preferred embodiment of the invention.

Referring to the drawings, in which the same reference numbers indicate the same parts, the overall operation is best understood by reference to FIG. 1. In FIG. 1, it is seen that the preferred embodiment schematically involves a meat injection nozzle 10, two opposing mold halves 12 and 14, a transference wheel 16, a stick handle hopper 18, a stick handle-inserting means 20, a stick handle-ejecting means 22, and a conveying belt 24 for carrying the molded meat stick away from the transference wheel 16.

For ease in understanding the operation to be described, it may be helpful at this point to indicate that the stick handles are stored in the stick handle hopper 18, are inserted in the apertures of the transference wheel 16 by the stick handle-inserting means 20, the wheel is then rotated until the stick is aligned between the opposing mold halves 12 and 14 which then close about the meat injection nozzle 10 and the stick handle, at which time meat is injected into the mold cavity through the meat injection nozzle 10, the opposing mold halves are then moved apart and the transference wheel 16 rotated, and the stick handle ejected from the transference wheel 16 by ejecting means 22 onto conveyor belt 24 which carries the molded meat stick away from the transference wheel for packing.

The meat injection nozzle 10 is of conventional design and is attached by appropriate means such as a hose to an appropriate reservoir containing ground meat, and means such as an air pressure arrangement for forcing the ground meat from the reservoir through the hose and nozzle. A metering device must be used to permit the nozzle to dispense only the proper amount of ground meat to be accommodated by the mold cavity. Also, the ejection through the nozzle must be timed to correspond to the closing of the mold halves 12 and 14. Such metering equipment, reservoirs and the like, as well as timing devices for use therewith, are conventional.

The mold halves 12 and 14 are best seen in FIGS. 3, 4, 5 and 6 as comprising generally a mold plate 26, a flexible diaphragm 28, and attachment means such as ring 30 for securing the flexible diaphragm to the mold plate.

In the preferred embodiment, the mold plate 26 is made of metal or plastic materials which is relatively undeformable, unbreakable, and which is sufficiently heavy to produce smooth, sure operation. It is to be noted that the mold plate may be made of white sanitary brass or an appropriate machinable nylon or Teflon. Each mold plate 26 is formed with a central mold cavity 32 in the half shape of the final product so that when the mold halves are joined they will delineate the precise shape of the final molded meat about the stick handle. Leading into the central cavity 32 at one end is a recessed semi-cylindrical channel 34 which defines an opening for receiving the end of the meat injection nozzle 10. At the other end of the mold cavity is a semi-cylindrical channel 36 for receiving the upper end of the stick handle.

The flexible diaphragm 28 may be made of any flexible material which has a texture which minimizes the tendency of ground meat to adhere to it. Preferably, pure gum rubber or non-toxic neoprene is to be used and has been found very effective in use with ground meat products.

The flexible diaphragm 28 is stretched tautly over the entire face of the mold half, as is shown in FIG. 3, to cover the entire mold cavity 32 as well as the nozzle and stick channels 34 and 36. The flexible diaphragm may be held to the mold plates 26 by means of an attachment ring 30 which may extend completely around the mold plate and the edges of the diaphragm, and then secured to the mold plate 26 by any conventional means, such as screws.

It is to be particularly noted that the surfaces of the flexible diaphragms 28 on each mold plate 26 will be in touching relationship when the opposing mold halves 12 and 14 are moved together. Because of the flexibility of the material of the flexible diaphragm 28, meat injected by the nozzle 10 between the flexible diaphragms 28 will cause the diaphragm 28 to flex and assume the configuration of the mold cavity as is shown in FIG. 3, and will also permit the receipt of the nozzle 10 into the nozzle channels 34 and the stick handle into the stick channel 36 to form a very tight seal around each.

Any appropriate means may be used to move the mold halves together although as shown in FIGS. 1 and 2, servo motors 38 and 40 are used and are operated by air pressure in sequence in corresponding with the position of rotation of the transference wheel 16.

More particularly, the opposing mold halves 12 and 14 are shown as being secured to base plates 42 and 44 by the use of a spring-biased hooking means 46. The spring-biased hooking means 46 are specifically designed for use with the present mold halves in order to permit a more resilient action in the return of the mold halves 12 and 14 from the forming operation and to permit easy changing of the mold halves when desired. The spring-biased hooking means 46 are seen in FIG. 2 as including an elongated shaft 48 terminating in a hooked portion 49, the shaft extending through an opening formed within the base plates 42 and 44. The other end of the shaft 48 opposite the hook end is threaded to receive a nut 50. Between the base plates 42 and 44 and the nut 50 is a compression spring 52 which may be tightened or loosened by the adjustment of the nut 50. The end of the shaft 48 may be fitted with a knob 54 to permit easy gripping and turning of the entire shaft. As shown in FIG. 2, in the preferred embodiment, four of these are used, two on either side, to secure the mold halves 12 and 14 to the base plates 42 and 44. The base plates 42 and 44 are then secured to a piston shaft 56 at one end, the other end of the piston shaft extending into the respective cylinders 58 and terminating in appropriate pistons 60 adapted to be driven by fluid pressure to close the mold halves 12 and 14. The cylinders 58 may be double acting and provided with appropriate fluid means to actuate the pistons in each direction to respectively move the opposing mold halves apart and to move them together in timed sequence with the rotation of the transference wheel 16 into position between the mold halves.

The stick handle hopper 18 is of conventional design, utilizing an inclined bottom to cause the sticks to be moved by gravity downwardly to the indexing wheel 62 which includes spaced, axially aligned recesses 61 along its circumference for the receipt of the sticks and for moving them into position for insertion into the transference wheel 16.

The stick handle-inserting means 20 is comprised of a simple servo motor, which may be fluid operated, to force the movement of the stick injection shaft 64, and which in turn pushes the stick handle forwardly along the aligned circumferential recess on the indexing wheel 62 snugly into the apertures 68 in the transference wheel 16.

The transference wheel 16 is seen to be provided with a circumferential lip portion 66 into which is formed a plurality of apertures 68, each of which extends radially through the lip and each of which is of slightly greater diameter than the aforesaid stick handles. The dimension of these apertures is critical and must be of a sufficiently close tolerance in relation to the diameter of the stick handle to assure that the stick handle will be firmly held throughout the rotation of the wheel and when subjected to the molding pressures involved at the mold station. The transference wheel 16 must be of sufficiently small diameter to minimize the length of time the molded meat stick will be self-supporting, yet sufficiently large to permit the receipt of the operating portion of the stick handle-ejecting means 22 which must be aligned with the apertures 68 in the lip 66 of the transference wheel 16.

The stick handle-ejecting means 22 is comprised of a simple shaft 65 of a diameter substantially equal to that of the stick handle, and operated by a conventional servo motor 67 to push the stick through the apertures onto the conveyor belt 24.

In the operation of the apparatus as described, the stick hopper 18 is initially loaded, and continuously reloaded, with stick handles 11 which are fed gravitationally downwardly through an appropriate opening in the hopper and into the aligned recess 61 in the indexing wheel 62. An appropriate motor-driven means is used to rotate the transference wheel 16 until one of the apertures 68 is aligned with the stick-filled recess 61 of the indexing wheel 62 at the first station. As used in this application, the term "first station" is used to indicate the position of the respective apertures 68 on the transference wheel 16 when in the stick-injecting area; the term "second station" is used to indicate the position of the respective apertures 68 when in the mold-forming position; and the term "third station" is used to indicate the position of the respective apertures 68 when in the stick-ejecting position. It is to be noted that these stations, as shown in FIG. 1 and as taught in this particular embodiment of the invention, are achieved simultaneously, for the various apertures on the various portions of the wheel as they are rotated simultaneously into any one station position.

The stick injection shaft 64 is then moved forwardly by the servo motor 67 to push against the mold end of the stick handle 11 and to force the handle end of the stick along the aligned recess 61 in the indexing wheel 62 snugly into the aperture 68. The stick handle need be pushed into the aperture 68 only a sufficient depth to insure that the stick handle will be tightly gripped in its travel through the various stations, considering the pressures which will be exerted on the stick in the molding station, and the necessity that the stick be gripped sufficiently tightly to withstand the additional force which will be placed upon it when the molded plastic product is secured around the end.

The transference wheel 16 is then rotated by appropriate means to move the inserted stick handle upwardly toward the molding or second station. When the transference wheel 16 is stopped, means are utilized to rigidly hold the transference wheel in a substantially rigid, stationary position to facilitate the stick injection, the mold formation, and the stick ejection steps.

When the stick handle 11 has been rotated into the second station and the transference wheel 16 stopped in a relatively rigid, stationary position, appropriate means are used to cause the movement of the respective mold halves 12 and 14 together to a closed position. As the mold halves 12 and 14 are moved together, the injection nozzle 10 pushes the flexible diaphragm 28 on each of the mold halves into the respective nozzle channels 34 formed in the mold face. Simultaneously, the stick handle forces the flexible diaphragm 28 into the stick channels 36 formed in each mold face. As the mold halves 12 and 14 continue to close, a tight seal is formed by the flexible diaphragm 28 around the injection nozzle 10 and the stick handle 11. When the mold is completely closed, then appropriate means are used to actuate the flow of a metered amount of plastic material, such as ground meat, through the injection nozzle 10, under pressure, into the space between the opposing flexible diaphragms 28. This entrance of the plastic material such as ground meat under pressure into the space between the flexible diaphragms 28, forces the diaphragms into the respective mold cavities, causing the flexible diaphragms 28 to assume the configuration of the mold cavities, and the soft plastic material, such as ground meat, to likewise assume the shape of the mold cavities. Of course, if there were not a tight seal surrounding the injection nozzle and the stick handle, the pressure within the mold cavities would be fairly rapidly dissipated. However, with the tight seal provided by the flexible diaphragms 28 around the injection nozzle 10 and the stick handle 11, the injection pressure is maintained substantially until the time the mold halves begin to part. Prior to the time the mold halves begin to part, it is to be particularly noted that the forces exerted by the internal plastic mass and fluid pressure just exceed the forces exerted by the resilient flexible diaphragms 28 tending to return to their natural conformation. However, as the mold halves begin to part, the forces exerted by the mold halves 12 and 14 on the flexible diaphragms 28 are gradually reduced and only the forces of the solft plastic mass remain on the diaphragms. As a further assurance that the flexible diaphragms 28 will be peeled smoothly from the plastic mass, the nuts 50 on the spring-biased hooking means 46 may be appropriately adjusted to reduce the pressure on the compression springs 52, thus providing additional resiliency to the entire mold halves 12 and 14 during the parting period. Because of the materials used in the flexible resilient diaphragms 28, there is very little adhesion between the soft plastic material, such as ground meat, and the mold diaphragms, and no residue is left on the diaphragms. The flexible resilient diaphragms 28 are thus immediately ready for the next molding operation.

As the molded stick handle is moved into the third position, the same servo motor 67 which is used to actuate shaft 64 is actuated to force the ejector shaft 65 forwardly through the aperture into contact with the handle end of the stick, which is then forced radially outwardly from the wheel, the molded stick handle dropping onto the conveyor belt 24 for transportation to a packing station.

In the preferred embodiment, it is to be noted that the operations at the first station, second station and third station are all carried on simultaneously. Further, the molded stick handle is shown as being carried through an arc of only 90 degrees before it is deposited upon the conveyor 24. This minimizes the length of time the molded stick handle is unsupported.

While in the foregoing specification we have set forth one preferred embodiment of the invention in considerable detail for purposes of illustration, it will be understood by those skilled in the art that many of these details may be varied without departing from the spirit and scope of the invention.

We claim:

1. An apparatus for molding soft plastic materials such as ground meat about a stick handle, comprising a frame, a wheel mounted for rotation in relation to said frame, means for driving said wheel to rotate intermittently to three stations and for locking said wheel firmly against movement in each station, said wheel being provided with apertures spaced equally around and extending through the wheel, said aperture being of substantially the same diameter as said stick handles to permit a tight gripping of said sticks, means at the first of said stations for forcing one end of a stick handle snugly into each of said apertures, two mold halves at the second of said stations located transversely of and adjacent the plane of said wheel, nozzle means at said second station located between and extending into said mold halves when together for dispensing a metered amount of soft plastic material into said mold halves around said stick, each of said mold halves comprising a mold base including a mold cavity communicating with a first channel for receiving the end of said nozzle means, and with a second channel for receiving the other end of said stick handle, a flexible resilient diaphragm covering the entire mold face, and means for holding said diaphragm tautly over said mold face, means for moving said mold halves together around said stick and said nozzle means at the second station and for moving the mold halves apart, and means at the third of said stations for ejecting said stick from said apertures.

2. The apparatus of claim 1 in which said diaphragms are adapted to form a pressure-tight seal when said mold halves are closed together around said stick and said nozzle means.

3. In a device for forming ground meat about a stick handle, a mold assembly comprised of two opposed mold halves, means for moving said mold halves together and apart, each of said mold halves forming a cavity in the central portion to delineate the form of the molded product, each of said mold cavities being formed with two outwardly-extending channels, one for receiving the end of an injection nozzle, and the other for receiving one end of a stick handle, a flexible resilient diaphragm covering the entire face of each of said mold halves including said first and second channels, and means for holding each of said diaphragms tautly over each of said mold faces so that a pressure-tight seal is formed between said mold halves when said mold halves are closed together around said stick handle and said extension nozzle means.

4. The mold assembly described and claimed in claim 3 including mold base plates resiliently secured to each of said mold halves.

References Cited by the Examiner

UNITED STATES PATENTS

| | | | |
|---|---|---|---|
| 492,206 | 2/1893 | Hunter et al. | |
| 1,958,184 | 5/1934 | Cross | 25—122 |
| 2,660,963 | 12/1953 | Covert et al. | 107—8 |
| 2,879,593 | 3/1959 | Schwartz | 17—32 X |
| 3,008,235 | 11/1961 | Royer et al. | 17—32 X |
| 3,099,037 | 7/1963 | Blake et al. | 17—1 |

SAMUEL KOREN, *Primary Examiner.*

LUCIE H. LAUDENSLAGER, *Examiner.*

H. P. DEELEY, JR., *Assistant Examiner.*